US008045631B2

(12) United States Patent
Huang et al.

(10) Patent No.: US 8,045,631 B2
(45) Date of Patent: Oct. 25, 2011

(54) METHOD AND APPARATUS FOR PACKET DETECTION IN WIRELESS COMMUNICATION SYSTEM

(75) Inventors: Yuheng Huang, San Diego, CA (US); Ozgur Dural, San Diego, CA (US); Samir S. Soliman, San Diego, CA (US); Amol Rajkotia, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 958 days.

(21) Appl. No.: 11/924,610

(22) Filed: Oct. 26, 2007

(65) Prior Publication Data

US 2008/0101504 A1    May 1, 2008

Related U.S. Application Data

(60) Provisional application No. 60/854,877, filed on Oct. 26, 2006.

(51) Int. Cl.
*H04K 1/10* (2006.01)
*H04L 27/28* (2006.01)

(52) U.S. Cl. ........ 375/260; 375/143; 375/152; 370/203; 370/208

(58) Field of Classification Search .......... 375/142–143, 375/150–152, 260, 343, 346–350; 370/203–211
See application file for complete search history.

(56) References Cited

U.S. PATENT DOCUMENTS

| | | | |
|---|---|---|---|
| 4,653,076 A | 3/1987 | Jerrim et al. | |
| 6,108,353 A | 8/2000 | Nakamura et al. | |
| 6,144,696 A | 11/2000 | Shively et al. | |
| 6,317,470 B1 | 11/2001 | Kroeger et al. | |
| 6,519,276 B1 | 2/2003 | Kim et al. | |
| 6,751,444 B1 | 6/2004 | Meiyappan | |
| 7,062,282 B2 | 6/2006 | Liu et al. | |
| 7,116,734 B1 | 10/2006 | Nergis | |
| 7,356,105 B1 | 4/2008 | Nergis | |
| 7,593,378 B1 * | 9/2009 | Murali et al. | 370/338 |
| 7,693,210 B2 * | 4/2010 | Margetts et al. | 375/150 |
| 2004/0081205 A1 | 4/2004 | Coulson | |

(Continued)

FOREIGN PATENT DOCUMENTS

EP        1398927 A1        3/2004

(Continued)

OTHER PUBLICATIONS

Davis M E et al: "Improved CDMA Performance Through Multiple Access Noise Rejection" Military Communications Conference, 1992. MILCOM '92, Conference Record. Communications-Fusing Command, Control and Intelligence., IEEE San Diego, CA, USA Oct. 11-14, 1992, New York, NY, USA, IEEE, US, (Oct. 11, 1992), pp. 846-850.

(Continued)

*Primary Examiner* — Curtis B Odom
(74) *Attorney, Agent, or Firm* — QUALCOMM Patent Group; Jonathan T. Velasco; James H. Yancey, Jr.

(57) ABSTRACT

An apparatus for detecting an OFDM symbol encoded with a transmitted sequence including a filter having coefficients based on a simplified version of the transmitted sequence is disclosed. A computer program product having code and a wireless communications apparatus for performing the method are also described herein.

17 Claims, 19 Drawing Sheets

U.S. PATENT DOCUMENTS

| | | | |
|---|---|---|---|
| 2004/0161046 A1* | 8/2004 | Schott et al. | 375/260 |
| 2005/0190817 A1 | 9/2005 | Batra et al. | |
| 2005/0232342 A1 | 10/2005 | Batra et al. | |
| 2005/0249268 A1* | 11/2005 | Batra et al. | 375/147 |
| 2006/0014508 A1* | 1/2006 | Seneschal et al. | 455/253.2 |
| 2006/0104332 A1 | 5/2006 | Deng et al. | |
| 2006/0280273 A1 | 12/2006 | Mueller-Weinfurtner | |
| 2006/0285478 A1 | 12/2006 | Gaikwad et al. | |
| 2007/0014271 A1* | 1/2007 | Lai | 370/342 |
| 2007/0153717 A1 | 7/2007 | Tervonen et al. | |
| 2008/0019467 A1* | 1/2008 | He | 375/347 |

FOREIGN PATENT DOCUMENTS

| | | |
|---|---|---|
| EP | 1662736 | 5/2006 |
| RU | 2202855 | 4/1998 |
| RU | 2195772 C2 | 12/2002 |
| RU | 2199184 C2 | 2/2003 |
| RU | 2234198 C1 | 8/2004 |
| RU | 2241312 C2 | 11/2004 |
| RU | 2250564 C2 | 4/2005 |
| TW | I231132 | 4/2005 |
| TW | I233739 | 6/2005 |
| TW | I241102 | 10/2005 |
| TW | I241797 | 10/2005 |
| WO | WO9815070 | 4/1998 |
| WO | WO9941854 | 8/1999 |
| WO | WO0101596 | 1/2001 |
| WO | WO2005029722 A1 | 3/2005 |
| WO | 2005069190 | 7/2005 |

OTHER PUBLICATIONS

Partial International Search Report—PCT/US07/082745, International Search Authority—European Patent Office—Feb. 9, 2009.
Berger, et al.: "Precise Timing for Multiband OFDM in a UWB System," The 2006 IEEE 2006 International Conference on Ultra-Wideband, pp. 269-274, XP031007147, ISBN: 1-4244-0101-1, Sep. 2006.
Hsieh, et al.: "A Low-Complexity Frame Synchronization and Frequency Offset Compensation Scheme for OFDM Systems Over Fading Channels," IEEE Transactions on Vehicular Technology, vol. 48, Issue 5, pp. 1596-1609, XP000912529, ISSN: 0018-9545, Sep. 19.
Yak, et al.: "Timing Synchronization and Frequency Offset Estimation for Ultra-Wideband (UWB) Multi-Band OFDM Systems," IEEE 16th International Symposium on Personal, Indoor and Mobile Radio Communications, 2005. PIMRC 2005, vol. 1, pp. 471-475, ISBN: 978-3-8007-29, Sep. 11-14, 2005.
Yoon, et al.: "Packet Detection and Symbol Timing Synchronization Algorithm for Multi-Band OFDM UWB," IEICE Transactions on Communications, vol. E89-B, No. 4, pp. 1433-1435, XP-001243306, ISSN: 0916-8516, Apr. 2006.
"ECMA-368: High Rate Ultra Wideband PHY and MAC Standard, Dec. 2005, ECMA International, Geneva, Switzerland".
Liu, et al., "Performance of asynchronous multicarrier cdma multiuser receiver over frequency selective multipath fading channels," Personal, Indoor and Mobile Radio Communications, 2003. PIMRC 2003. 14th IEEE Proceedings on Sep. 7-10, 2003, Piscataway, NJ, USA, IEEE, vol. 2, pp. 1536-1540, XP010679389.
International Search Report—PCT/US07/082745, International Searching Authority—European Patent Office, May 13, 2009.
Written Opinion—PCT/US07/082745, International Searching Authority—European Patent Office, May 13, 2009.
Translation of Office Action in Russian application 2009119732 corresponding to U.S. Appl. No. 11/924,606.
Translation of Office Action in Russian application 2009119743 corresponding to U.S. Appl. No. 11/924,609.
Translation of Office Action in Russian application 2009119752 corresponding to U.S. Appl. No. 11/924,610.
Meel, "Spread Spectrum (SS) Introduction", Studiedaag Spread Spectrum Oct. 6, 1999 (Hogenschool Voor Wetenschap & Kunst—De Nayer Instituti) pp. 1-33.
Lingwood S D et al: "ASIC implementation of a direct-sequence spread-spectrum Rake-receiver", Vehicular Technology Conference, 1994 IEEE 44th Stockholm, Sweden Jun. 8-10, 1994, New York, NY, USA,IEEE, Jun. 8, 994, pp. 1326-1330, XP010123293, DOI: DOI:10.1109/VETEC.1994.345309 ISBN: 978-0-7803-1927-1.
Schotten H D et al: "Iterative construction of sequences with low crosscorrelation values", Proceedings of The International Conference on Communications (ICC). Geneva, May 23-26, 1993; [Proceedings of the International Conference on Communications (ICC)], New York, IEEE, US. vol. 1, May 23, 1993, pp. 156-160, XP010136885, DOI: DOI: 10.1109/ICC. 1993.397248 ISBN: 978-0-7803-0950-0.
Taiwan Search Report—TW096140501—TIPO—May 2, 2011.
Canadian Office Action—2,665,157—CIPO—Jun. 7, 2011.
European Office Action—07844654.9—EPO—May 24, 2011.

* cited by examiner

DAA = Detect and Avoid

METHOD AND APPARATUS FOR PACKET DETECTION IN WIRELESS COMMUNICATION SYSTEM

CLAIM OF PRIORITY UNDER 35 U.S.C. §119

The present application for patent claims priority to Provisional Application No. 60/854,877, entitled "Signal Acquisition" filed Oct. 26, 2006, and assigned to the assignee hereof and hereby expressly incorporated by reference herein.

REFERENCE TO CO-PENDING APPLICATIONS FOR PATENT

The present application for patent is related to the following co-pending U.S. Patent Applications:

"Method and Apparatus for Timing Estimation in a Wireless Communications System" having Ser. No. 11/924,606, filed concurrently herewith, assigned to the assignee hereof, and expressly incorporated by reference herein.

"Method and Apparatus for Carrier Frequency Offset Estimation and Frame Synchronization in a Wireless Communications System" having Ser. No. 11/924,609, filed concurrently herewith, assigned to the assignee hereof, and expressly incorporated by reference herein.

BACKGROUND

1. Field

The present disclosed systems relates generally to a system for signal acquisition in a wireless communication system, and, more specifically, to a packet detection system for detecting packets in a received signal.

2. Background

Wireless networking systems have become a prevalent means by which a large number of people worldwide communicate. Wireless communication devices have become smaller and more powerful to meet consumer needs, which include improved portability and convenience. Users have found many uses for wireless communication devices, such as cellular telephones, personal digital assistants (PDAs), notebooks, and the like, and such users demand reliable service and expanded coverage areas.

Wireless communications networks are commonly utilized to communicate information regardless of where a user is located (inside or outside a structure) and whether a user is stationary or moving (e.g., in a vehicle, walking). Generally, wireless communications networks are established through a mobile device communicating with a base station or access point. The access point covers a geographic region or cell and, as the mobile device is operated, it may move in and out of these geographic cells. To achieve uninterrupted communication the mobile device is assigned resources of a cell it has entered and de-assigned resources of a cell it has exited.

A network can also be constructed utilizing solely peer-to-peer communication without utilizing access points. In further embodiments, the network can include both access points (infrastructure mode) and peer-to-peer communication. These types of networks are referred to as ad hoc networks). Ad hoc networks can be self-configuring whereby when a mobile device (or access point) receives communication from another mobile device, the other mobile device is added to the network. As the mobile devices leave the area, they are dynamically removed from the network. Thus, the topography of the network can be constantly changing. In a multihop topology, a transmission is transferred though a number of hops or segments, rather than directly from a sender to a recipient.

Ultra-wideband technology such as the WiMedia ultra-wideband (UWB) common radio platform has the inherent capability to optimize wireless connectivity between multimedia devices within a wireless personal area network (WPAN). The goals of the wireless standard is to fulfill requirements such as low cost, low power consumption, small-form factor, high bandwidth and multimedia quality of service (QoS) support.

The WiMedia UWB common radio platform presents a distributed medium-access technique that provides a solution to operating different wireless applications in the same network. The WiMedia UWB common radio platform incorporates media access control (MAC) layer and physical (PHY) layer specifications based on multi-band orthogonal frequency-division multiplexing (MB-OFDM). The WiMedia MAC and PHY specifications are intentionally designed to adapt to various requirements set by global regulatory bodies. Manufacturers needing to meet regulations in various countries can thus do so easily and cost-effectively. Some other application-friendly features that WiMedia UWB attempts to implement include the reduced level of complexity per node, long battery life, support of multiple power management modes and higher spatial capacity.

WiMedia UWB-compliant receivers have to cope with interference from existing wireless services while providing large bandwidth. At the same time, they have to perform with very low transmit power. One challenge faced by receivers in an operational environment is the acquisition of a signal and, further, the continued detection of valid packet traffic. False detection of packets, where the receiver mistakes noise as being valid packet traffic, or missed detection, where the receiver misses the detection of one or more packets, hinders the reliability and performance of the receiver. Further, being able to reliably detect the presence of packet traffic efficiently and with a small design footprint is a challenge.

There is therefore a need in the art for meeting the challenges noted above.

SUMMARY

The presently described approaches are directed to packet detection. In one approach, a method is described for performing packet detection. The method including receiving a transmitted sequence used to encode an OFDM symbol in a transmitted signal; and, filtering the received signal using a plurality of coefficients based on a simplified version of the transmitted sequence.

In another approach, an apparatus for detecting an OFDM symbol encoded with a transmitted sequence is described, the apparatus having a filter having coefficients based on a simplified version of the transmitted sequence.

In yet another approach, an apparatus for packet detection is described, the apparatus including means for receiving a transmitted sequence used to encode an OFDM symbol in a transmitted signal; and, means for filtering the received signal using a plurality of coefficients based on a simplified version of the transmitted sequence.

In still yet another approach, a wireless communications apparatus is disclosed, the wireless communications apparatus including an antenna configured to receive a signal; and, a control processor coupled to the antenna for performing a method for packet detection. The method including receiving a transmitted sequence used to encode an OFDM symbol in the signal; and, filtering the received signal using a plurality of coefficients based on a simplified version of the transmitted sequence.

In still yet another approach, a computer program product is disclosed, the computer program product including computer-readable medium having code for causing a computer to receive a transmitted sequence used to encode an OFDM symbol in the signal; and, code for causing the computer to filter the received signal using a plurality of coefficients based on a simplified version of the transmitted sequence.

In still yet another approach, a processor having a memory is disclosed, the memory configured to cause the processor to implement a method for packet detection. The method including receiving a transmitted sequence used to encode an OFDM symbol in a transmitted signal; and, filtering the received signal using a plurality of coefficients based on a simplified version of the transmitted sequence.

DETAILED DESCRIPTION

Figure 1:
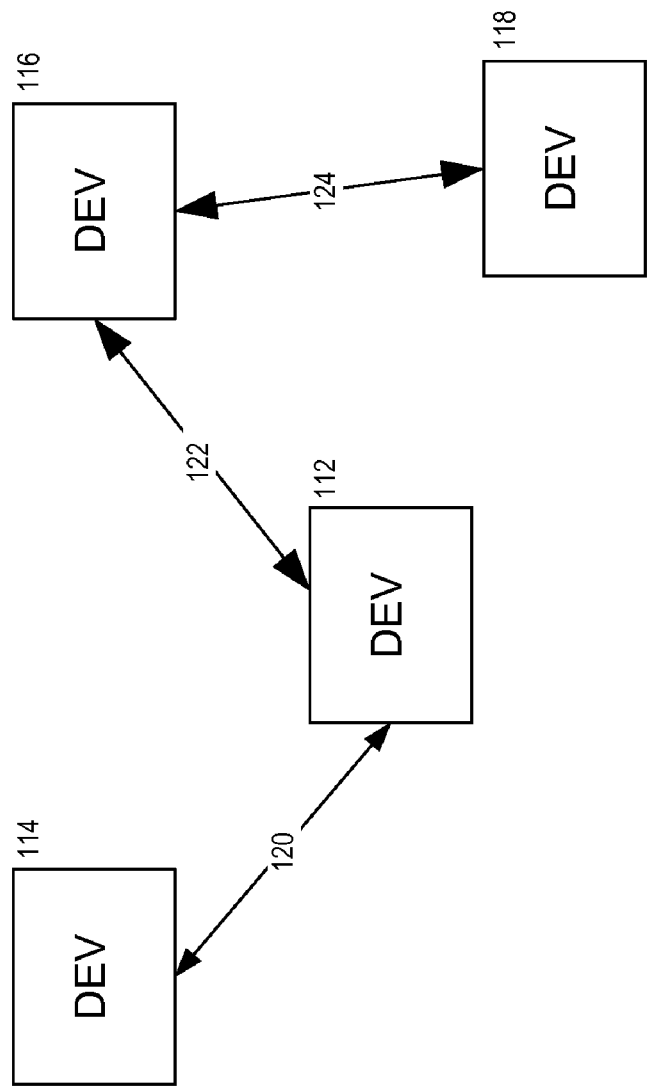
FIG. 1 is a block diagram of an exemplary ad hoc wireless network.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). The word "exemplary" is used herein to mean "serving as an example, instance, or illustration." Any embodiment described herein as "exemplary" is not necessarily to be construed as preferred or advantageous over other embodiments.

Furthermore, various embodiments are described herein in connection with a user device. A user device can also be called a system, a subscriber unit, subscriber station, mobile station, mobile device, remote station, access point, remote terminal, access terminal, terminal device, handset, host, user terminal, terminal, user agent, wireless terminal, wireless device, or user equipment. A user device can be a cellular telephone, a cordless telephone, a Session Initiation Protocol (SIP) phone, a wireless local loop (WLL) station, a Personal Digital Assistant (PDA), a handheld device having wireless connection capability, or other processing device(s) connected to a wireless modem. In certain embodiments, the user device may be a consumer electronics device with a UWB modem attached, such as printer, camera/camcorder, music player, standalone magnetic or flash storage device, or other AV equipment with content storage, for example.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, and the like, and/or may not include all of the devices, components, modules and so forth, discussed in connection with the figures. A combination of these approaches may also be used.

With reference now to the drawings, FIG. 1 illustrates example ad hoc wireless network 100. Wireless network 100 can include any number of mobile devices or nodes, of which four are illustrated for ease of illustration, that are in wireless communication. Mobile devices can be, for example, cellular phones, smart phones, laptops, handheld communication devices, handheld computing devices, satellite radios, global positioning systems, Personal Digital Assistants (PDAs), and/or other suitable devices for communicating over wireless network 100. Wireless network 100 can also include one or more base stations or access points (not shown).

Figure 2:
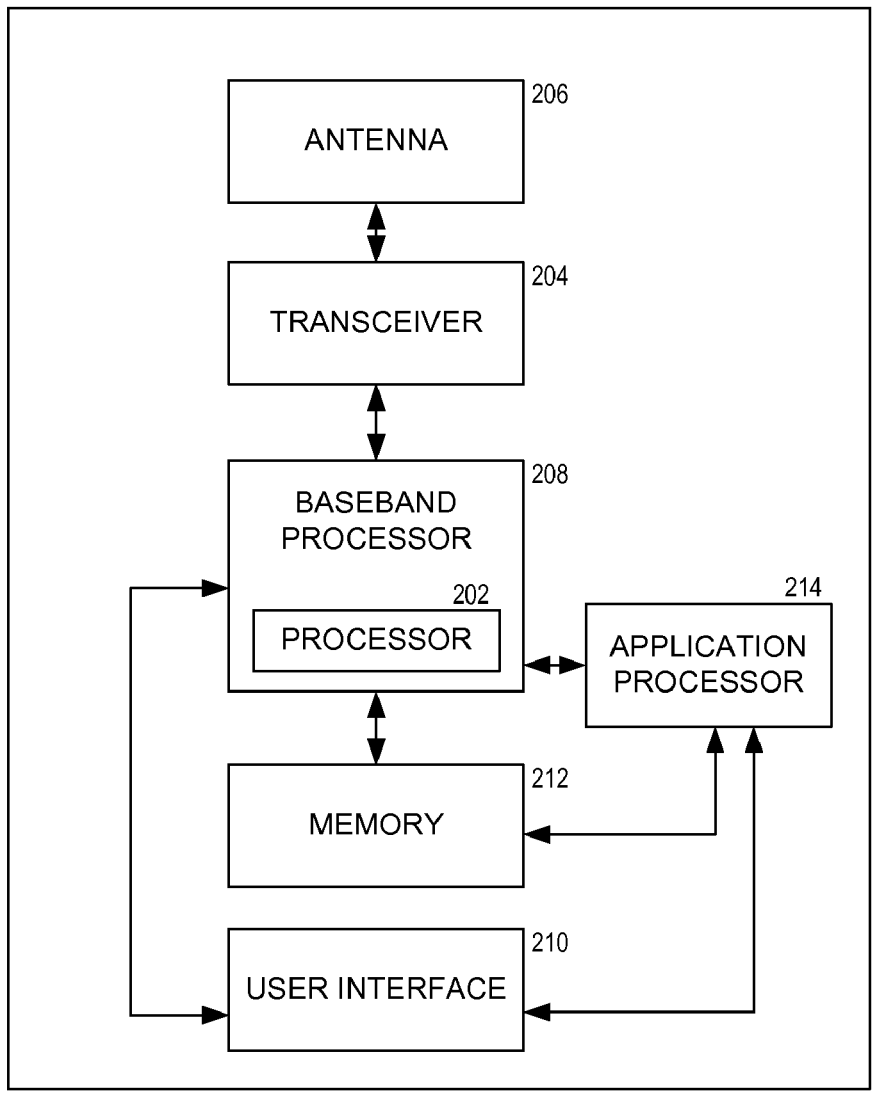
FIG. 2 is a block diagram of an exemplary wireless terminal device.

In wireless network 100, terminal device 112 is shown communicating with terminal device 114 via communication link 120 and with terminal device 116 via communication link 112. Terminal device 116 is also shown communicating with terminal device 118 via communication link 124. Terminal devices 112, 114, 116 and 118 may be structured and configured in accordance with the exemplary simplified block diagram of a possible configuration of a terminal device 200 as shown in FIG. 2. As those skilled in the art will appreciate, the precise configuration of terminal device 200 may vary depending on the specific application and the overall design constraints. Processor 202 can implement the systems and methods disclosed herein.

Terminal device 200 can be implemented with a front-end transceiver 204 coupled to an antenna 206. A baseband processor 208 can be coupled to the transceiver 204. The baseband processor 208 can be implemented with a software based architecture, or other type of architectures, such as hardware or a combination of hardware and software. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Terminal device 200 can also include various user interfaces 210 coupled to the baseband processor 208. User interfaces 210 can include a keypad, mouse, touch screen, display, ringer, vibrator, audio speaker, microphone, camera, storage and/or other input/output devices.

The baseband processor 208 comprises a processor 202. In a software-based implementation of the baseband processor 208, the processor 202 may be a software program running on a microprocessor. However, as those skilled in the art will readily appreciate, the processor 202 is not limited to this embodiment, and may be implemented by any means known in the art, including any hardware configuration, software configuration, or combination thereof, which is capable of performing the various functions described herein. The processor 202 can be coupled to memory 212 for the storage of data. An application processor 214 for executing application operating system and/or separate applications may also be provided as shown in FIG. 2. Application processor 214 is shown coupled to baseband processor 208, memory 212, and user interface 210.

Figure 3:
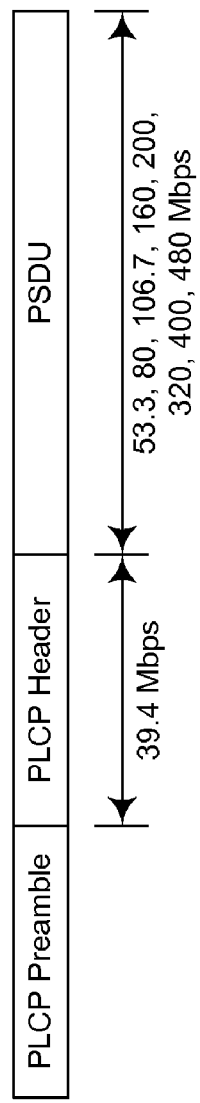
FIG. 3 is a packet structure conforming to the WiMedia Ultra-Wideband (UWB) standard.

FIG. 3 illustrates a packet structure 300 of a packet conforming with the WiMedia Ultra-Wideband (UWB) physical layer (PHY) and media access layer (MAC) standard for high rate, short range wireless communication as promulgated by ECMA International in Standard ECMA-368, "High Rate Ultra Wideband PHY and MAC Standard" (December 2005).

Figure 4:
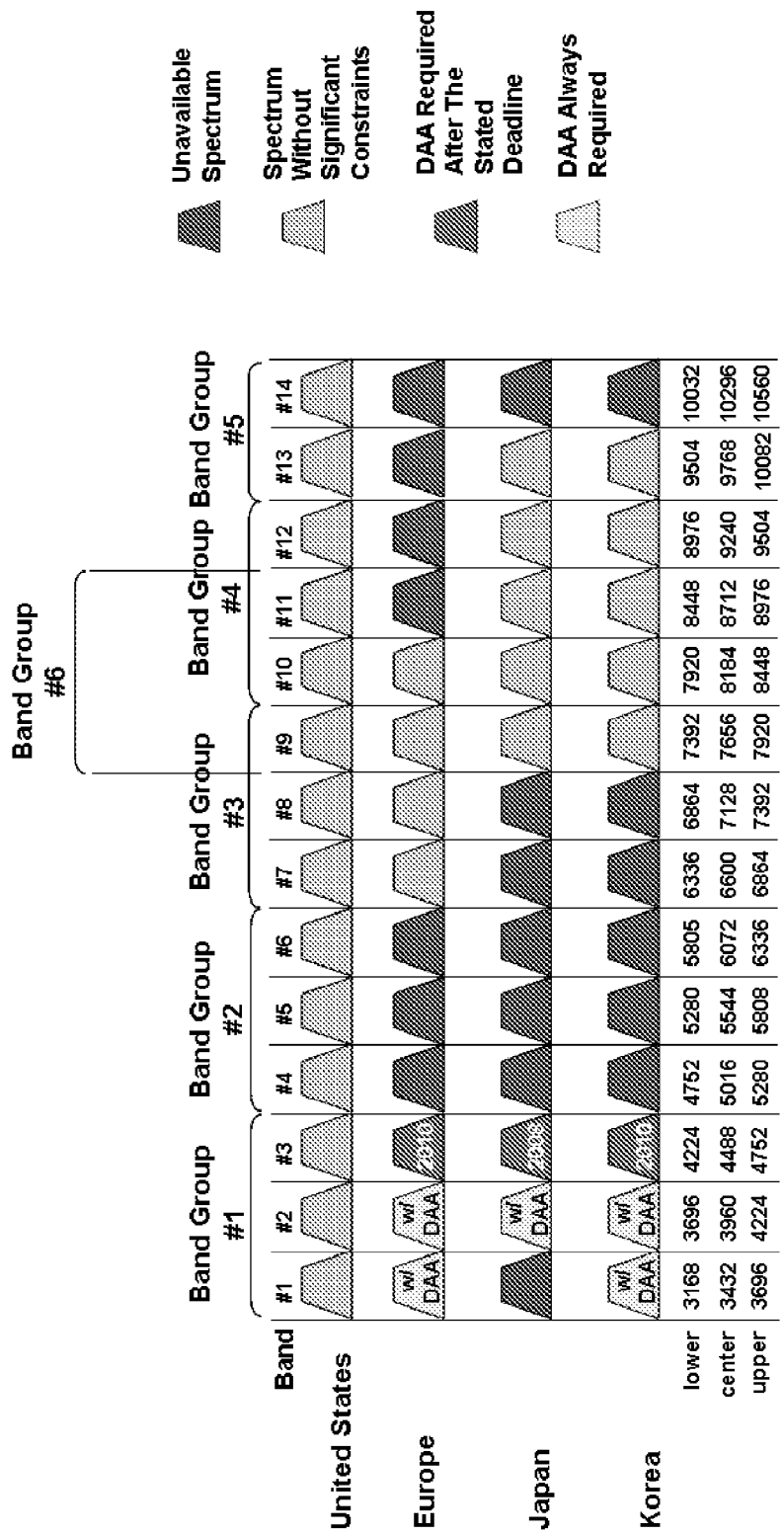
FIG. 4 is a chart of the worldwide allocation of the UWB spectrum.

The ECMA Standard specifies a UWB PHY for a wireless personal area network (PAN) utilizing the unlicensed 3,100-10,600 MHz frequency band, supporting data rates of 53.3 Mb/s, 80 Mb/s, 106.7 Mb/s, 160 Mb/s, 200 Mb/s, 320 Mb/s, 400 Mb/s, and 480 Mb/s. The UWB spectrum is divided into 14 bands, each with a bandwidth of 528 MHz. The first 12 bands are then grouped into 4 band groups consisting of 3 bands, and the last two bands are grouped into a fifth band group. FIG. 4 illustrates a worldwide allocation of the UWB spectrum.

This ECMA Standard specifies a multiband orthogonal frequency division modulation (MB-OFDM) scheme to transmit information. A total of 110 sub-carriers (100 data carriers and 10 guard carriers) are used per band to transmit the information. In addition, 12 pilot subcarriers allow for coherent detection. Frequency-domain spreading, time-domain spreading, and forward error correction (FEC) coding are used to vary the data rates. The FEC used is a convolutional code with coding rates of $1/3$, $1/2$, $5/8$ and $3/4$.

The coded data is then spread using a time-frequency code (TFC). In one approach, as promulgated by the ECMA standard, there are two types of time-frequency codes (TFCs): one where the coded information is interleaved over three bands, referred to as Time-Frequency Interleaving (TFI); and, one where the coded information is transmitted on a single band, referred to as Fixed Frequency Interleaving (FFI).

Within each of the first four band groups, four time-frequency codes using TFI and three time-frequency codes using FFI are defined; thereby, providing support for up to seven channels per band. For the fifth band group, two time-frequency codes using FFI are defined. This ECMA Standard specifies 30 channels in total.

Figure 5:
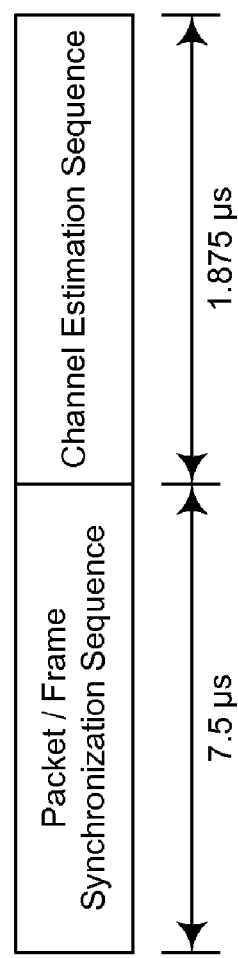
FIG. 5 is a preamble structure of the packet of FIG. 3.

FIG. 5 illustrates the standard preamble structure of the WiMedia UWB packet of FIG. 3. The preamble contains a total of 30 OFDM symbols. The first 24 preamble symbols are used for packet detection, timing estimation, CFO estimation and frame synchronization. Channel estimation uses the last 6 preamble symbols.

Figure 6:
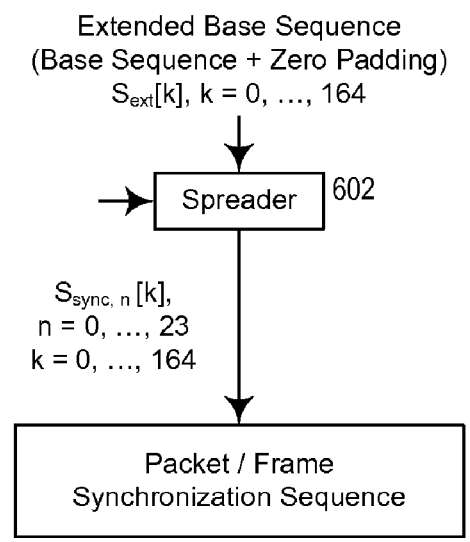
FIG. 6 is a block diagram of a packet/frame synchronization sequence generator for the preamble structure of FIG. 5.

FIG. 6 is a block diagram of a preamble symbol generator 600, including a spreader 602, illustrating one approach of how preamble symbols may be generated, where:

1. For a given a time-frequency code (TFC) (i.e., 1-10, referred to as TFC-1 to TFC-10), select the time-domain base sequence $s_{base}[m]$, m=0, 1, . . . , 127 and the binary cover sequence $s_{cover}[n]=\pm 1$, n=0, 1, . . . , 23. The binary cover sequence is used as a delimiter for determining the ending of the packet/frame synchronization sequence.

2. Pad 37 zeros at the end of the base sequence to form the extended sequence $s_{ext}[k]$, k=0, 1, . . . , 164.

3. Spread the cover sequence with the extended based sequence using the spreader 602. The kth sample of the nth preamble symbol is given by:

$$s_{sync,n}[k]=s_{cover}[n]\times s_{ext}[k], k=0, 1, \ldots, 164,$$
$$n=0, 1, \ldots, 23.$$

Figure 7:
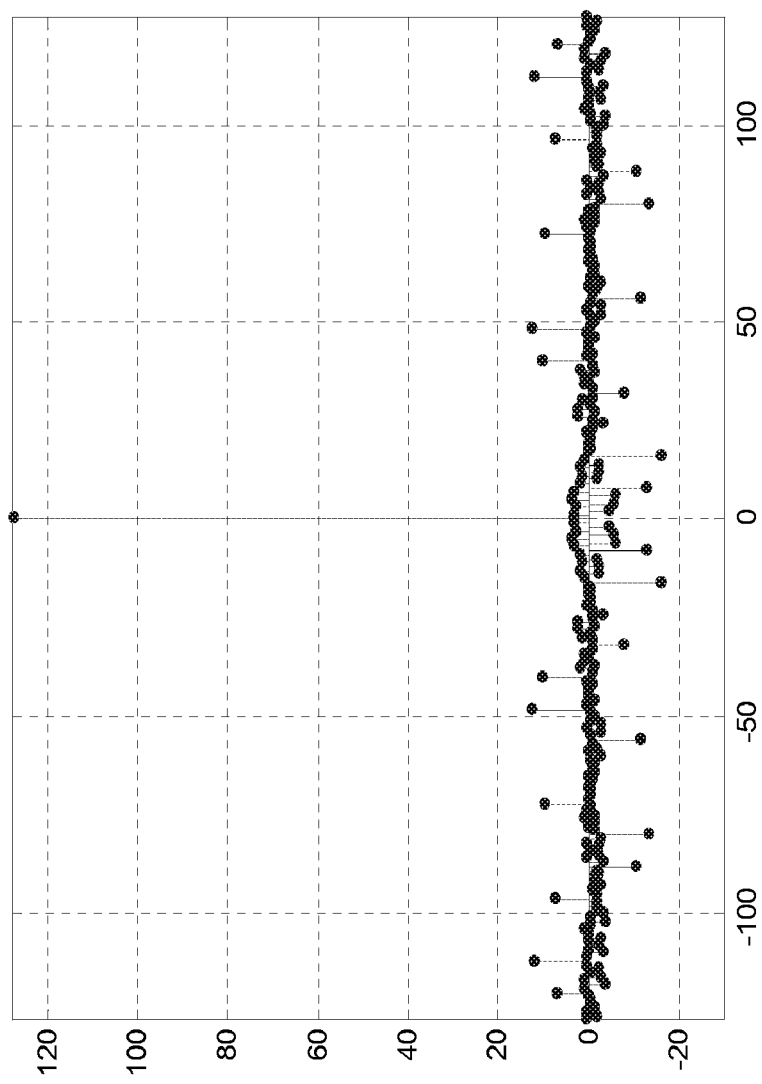
FIG. 7 is a plot of an aperiodic auto-correlation function of a base sequence used to generate a preamble pattern.
Figure 8:
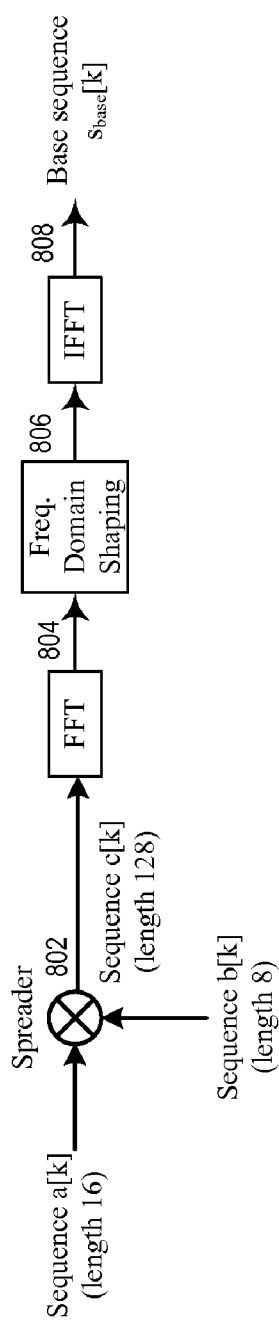
FIG. 8 is a block diagram of a hierarchical base sequence generator used to generate a base sequence.

FIG. 7 illustrates the aperiodic auto-correlation of the base sequence $s_{base}[m]$ corresponding to TFC-1. Other base sequences may have similar auto-correlation functions. In one synchronization approach, the excellent auto-correlation property is exploited. For example, the base sequence is generated from a hierarchical base sequence generator 800 as shown in FIG. 8. The basic premise behind using a hierarchical sequences is to partition the encoding process at the transmitter into a hierarchy so that the complexity of the decoding process at the receiver is reduced. Referring to the figure, a first binary sequence {a[k], k=0, 2, . . . , 15} is spread by a second binary sequence {b[k], k=0, 2, . . . , 7} with a spreader

802 to generate an intermediate sequence (also referred to as a binary hierarchical sequence) C {c[k], k=0, 2, ..., 127} of length 128. Then, after taking a fast Fourier transform (FFT) of the intermediate sequence C using an FFT module 804 and shaping the sequence in the frequency domain using a frequency domain shaping module 806, the sequence is transformed back to the time domain via an inverse FFT (IFFT) module 808 to obtain the base sequence $s_{base}[m]$. There is a unique set of binary sequences {a[k]} and {b[k]} corresponding to each of the ten base sequences.

Figure 9:
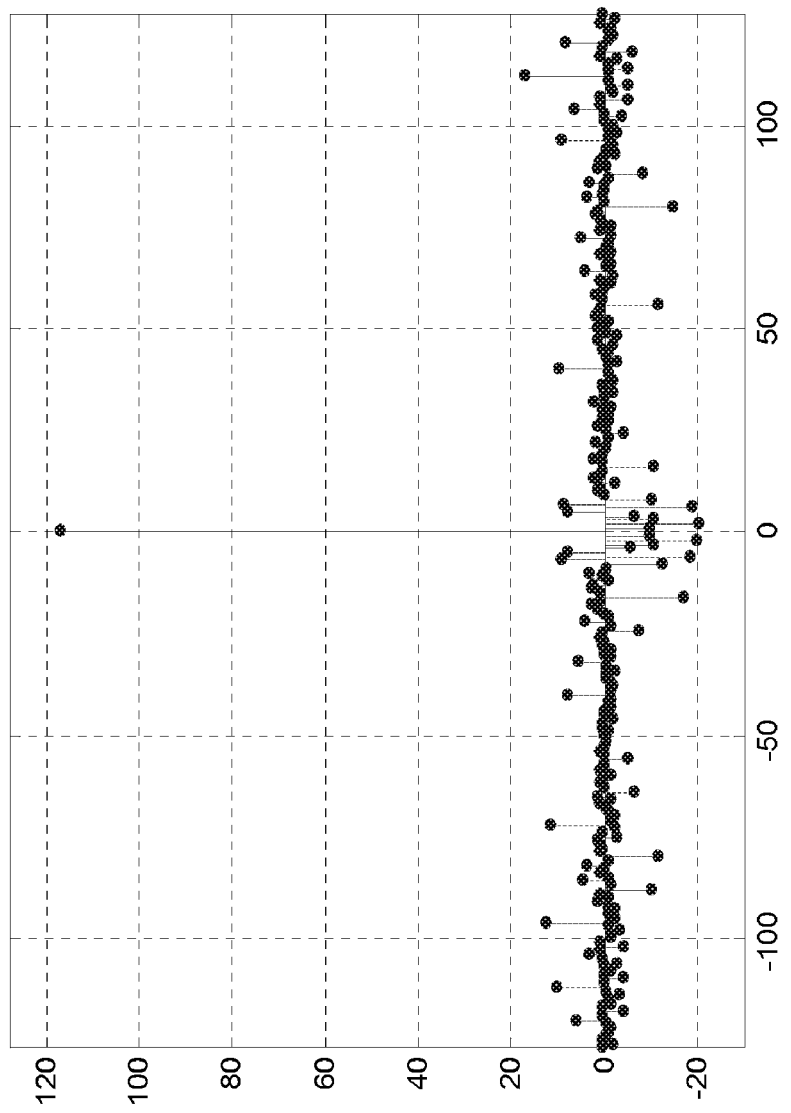
FIG. 9 is a plot of the aperiodic cross-correlation between the base sequence of FIG. 7 and the corresponding hierarchical base sequence of FIG. 8.
Figure 10:
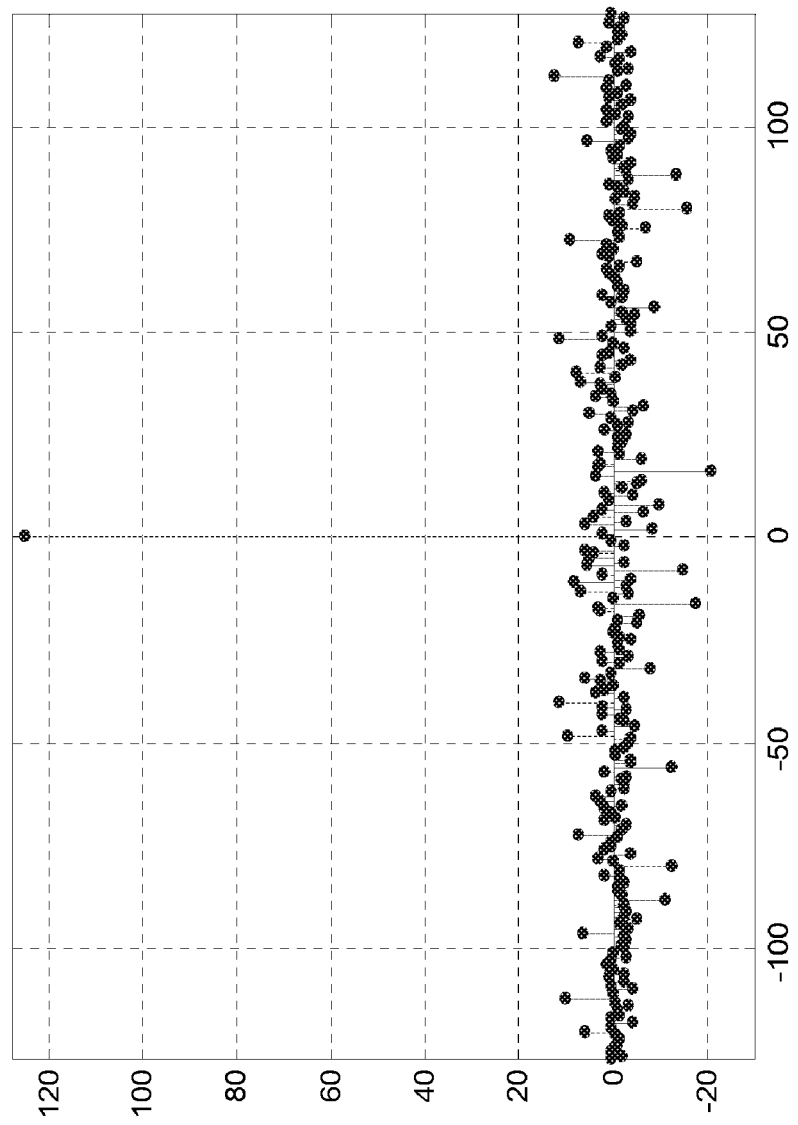
FIG. 10 is a plot of the aperiodic cross-correlation between the base sequence of FIG. 7 and a rounded version of the corresponding base sequence.

FIG. 9 illustrates the aperiodic cross-correlation between the base sequence $s_{base}[m]$ for TFC-1 and the corresponding intermediate sequence C {c[k]} generated using the hierarchical base sequence generator 800. This cross-correlation property indicates that when a matched filter is employed at the receiver, the base sequence can be replaced by the binary sequence C as the filter coefficients. In one approach, as illustrated below, the hierarchical structure of the binary sequence C can be efficiently used to simplify the hardware of the receiver used for synchronization. Further, it may be advantageous to use the rounded version of the preamble base sequence as the matched filter coefficients as well. FIG. 10 illustrates the aperiodic cross-correlation between the base sequence $s_{base}[m]$ for TFC-1 and the rounded version of the corresponding base sequence.

Figure 11:
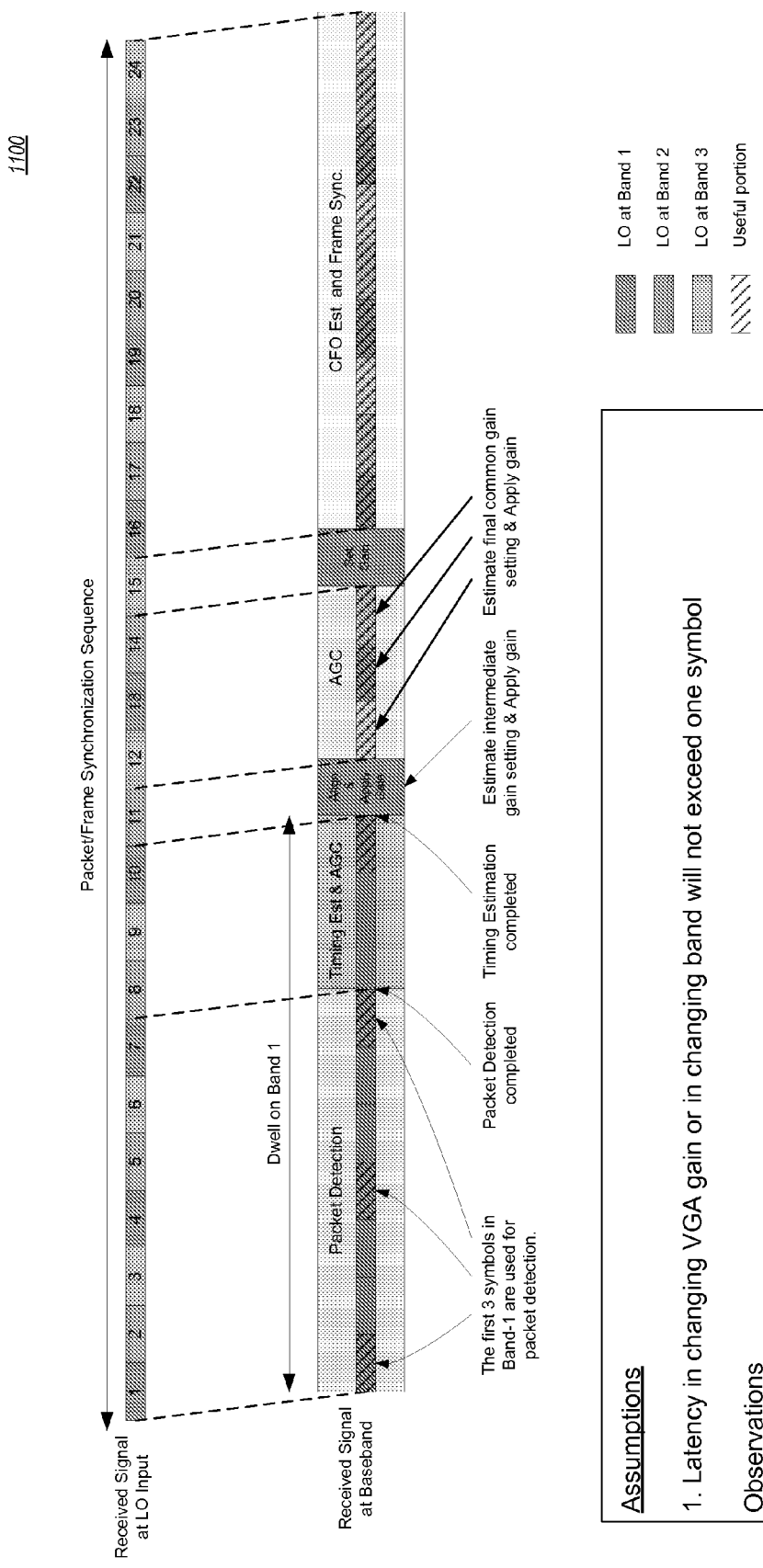
FIG. 11 is a timeline illustrating the acquisition/synchronization process for time-frequency code (TFC)-1 and TFC-2.
Figure 12:
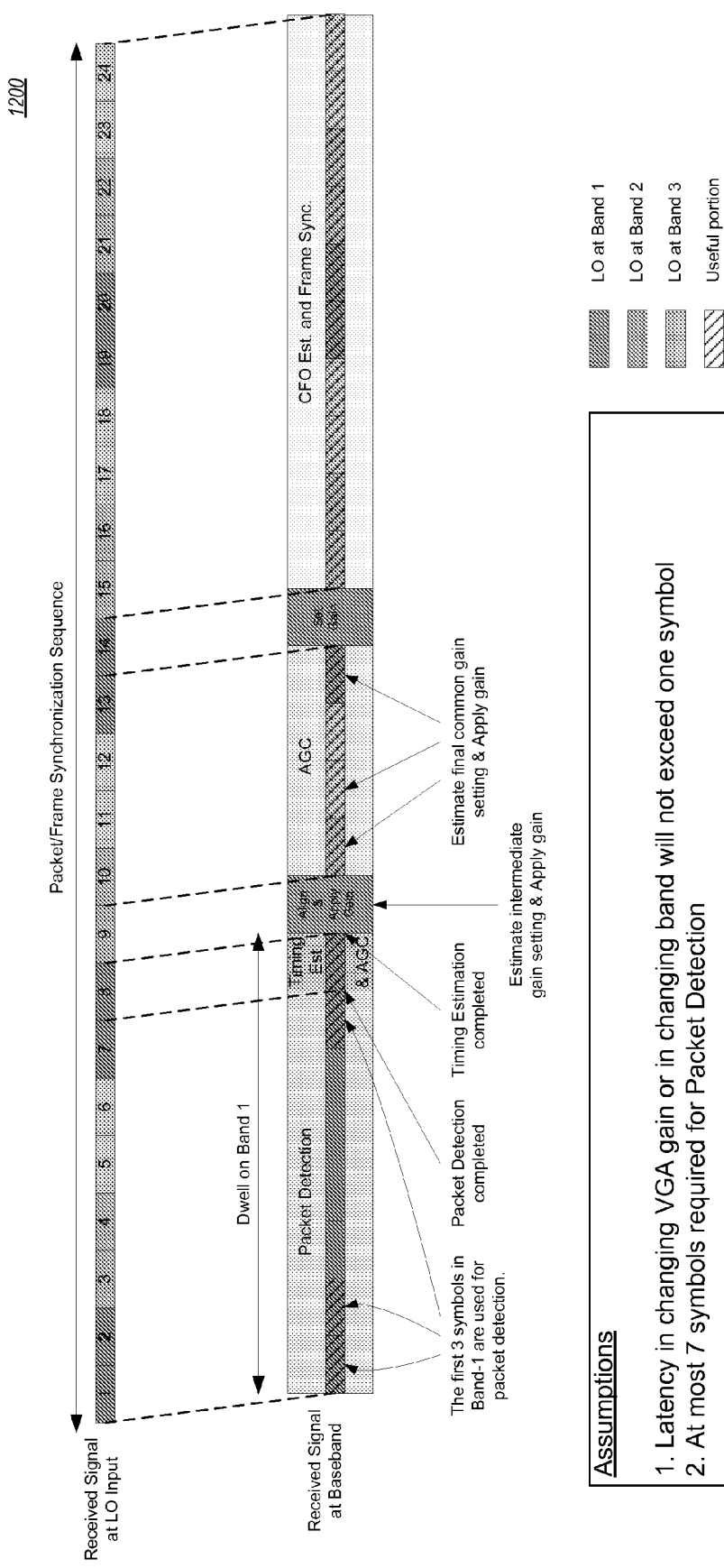
FIG. 12 is a timeline illustrating the acquisition/synchronization process for TFC-3 and TFC-4.
Figure 13:
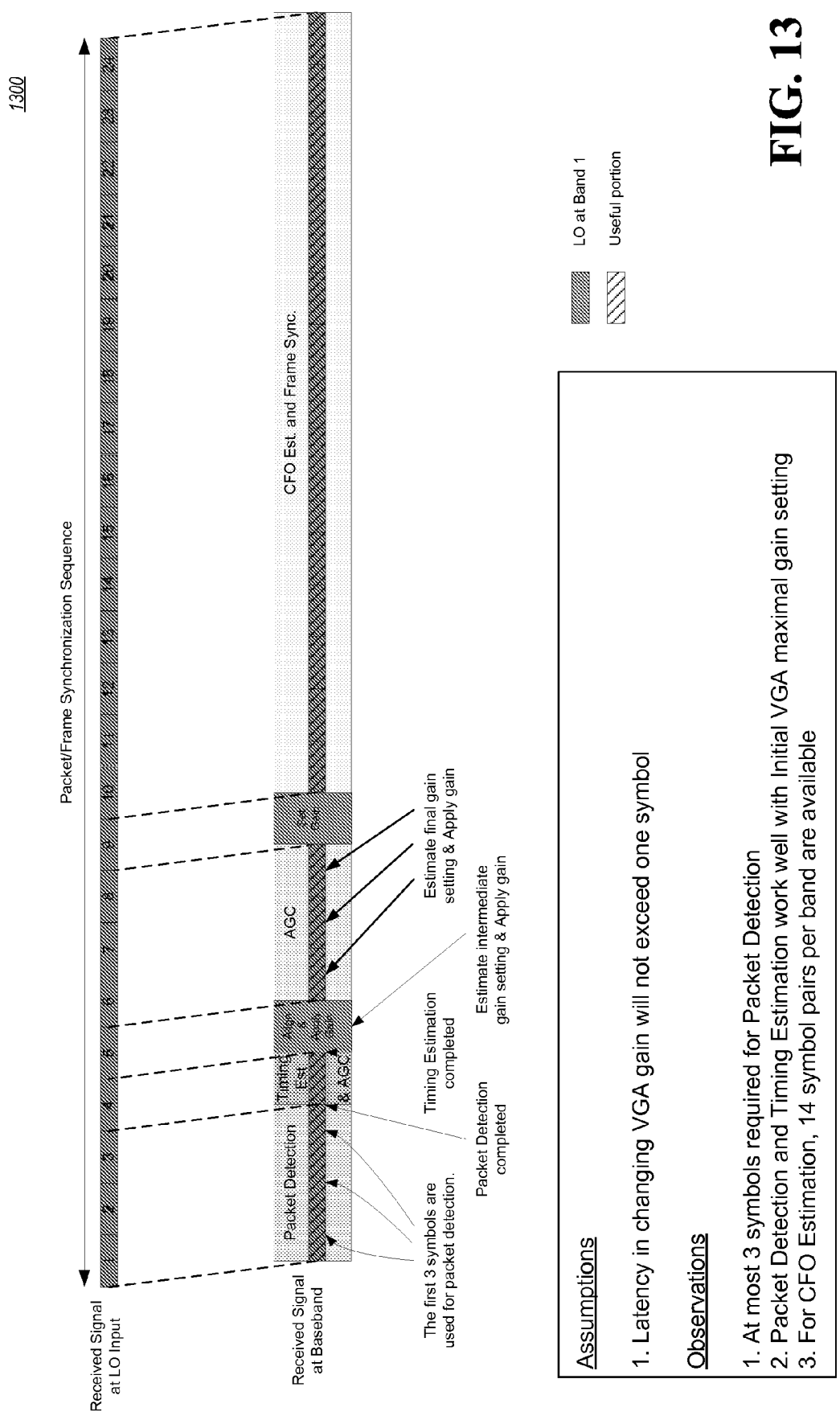
FIG. 13 is a timeline illustrating the acquisition/synchronization process for TFC-5, TFC-6 and TFC-7.
Figure 14:
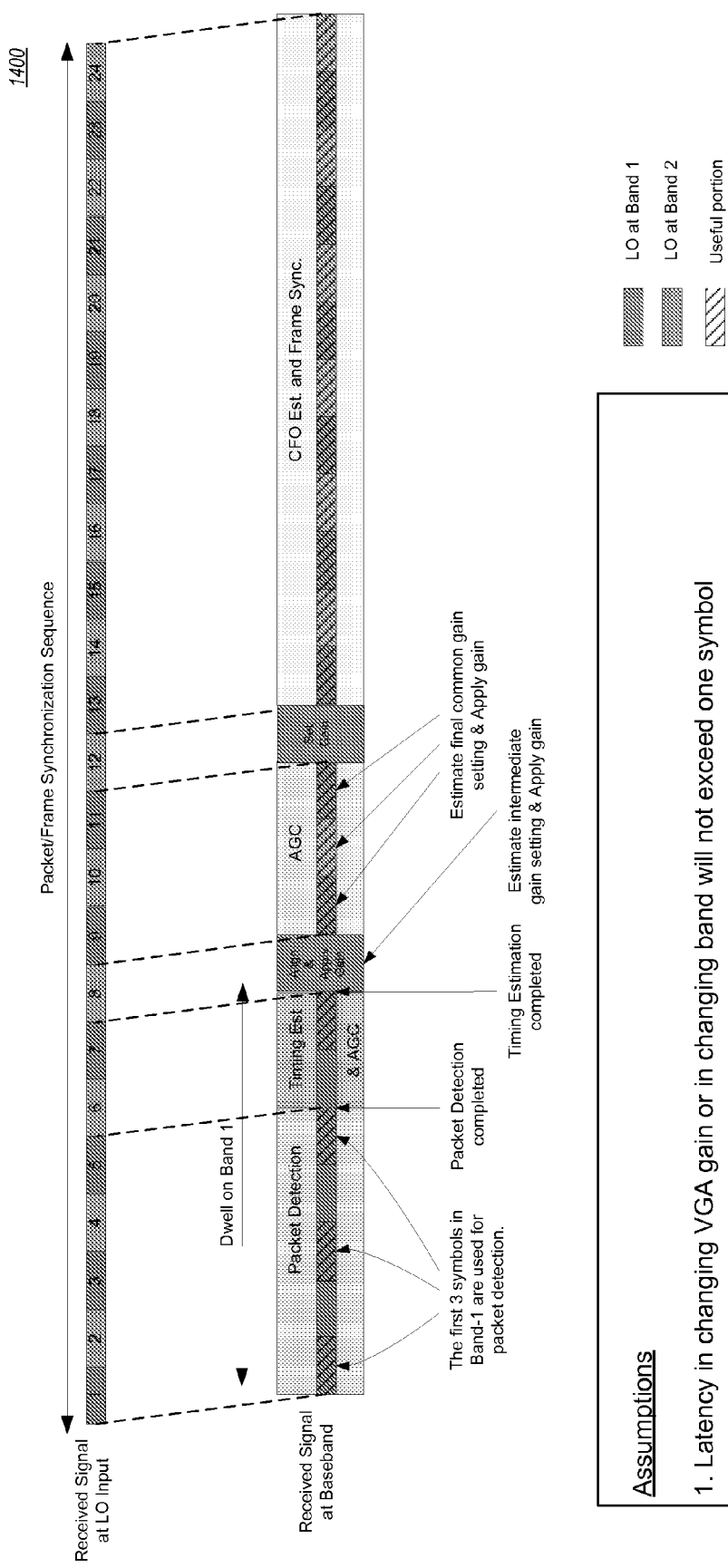
FIG. 14 is a timeline illustrating the acquisition/synchronization process for TFC-8, TFC-9 and TFC-10.

As a synchronization overview, FIG. 11-FIG. 14 illustrate the synchronization and acquisition timelines for all the TFCs. Specifically, FIG. 11 illustrates an acquisition timeline 1100 for TFC-1 and TFC-2; FIG. 12 illustrates an acquisition timeline 1200 for TFC-3 and TFC-4; FIG. 13 illustrates an acquisition timeline 1300 for TFC-5, TFC-6 and TFC-7; and FIG. 14 illustrates an acquisition timeline 1400 for TFC-8, TFC-9 and TFC-10.

Referring initially to FIG. 11, the major synchronization tasks can separated into three separate parts:
1. Packet detection.
2. Timing estimation.
3. Carrier frequency offset (CFO) estimation and frame synchronization.

As discussed above, the ECMA standard provides for multiple bands and, as seen from the timelines for all TFCs, a receiver will by default dwell on Band-1 before packet detection is asserted. This is because before packet detection, the receiver has no knowledge about the correct timing to switch to other bands (if it is in the TFI mode). Thus, the first three preamble symbols in Band-1 will be consumed for packet detection. Once packet detection has been completed, the next phase, timing estimation, is enabled and the receiver will scan for the next preamble symbol in Band-1 to determine the optimal FFT window for the OFDM symbol. After timing estimation has been completed (e.g., the timing is recovered) for Band-1, the receiver will have enough information to know to switch to other bands according to the TFC, and automatic gain control (AGC) gain estimation will be performed. After AGC is settled, the rest part of the preamble symbols will be used for CFO estimation and frame sync detection. Whenever frame sync is detected, the final output of the CFO estimation will be sent to a phase rotator and the receiver will proceed with channel estimation.

Figure 15:
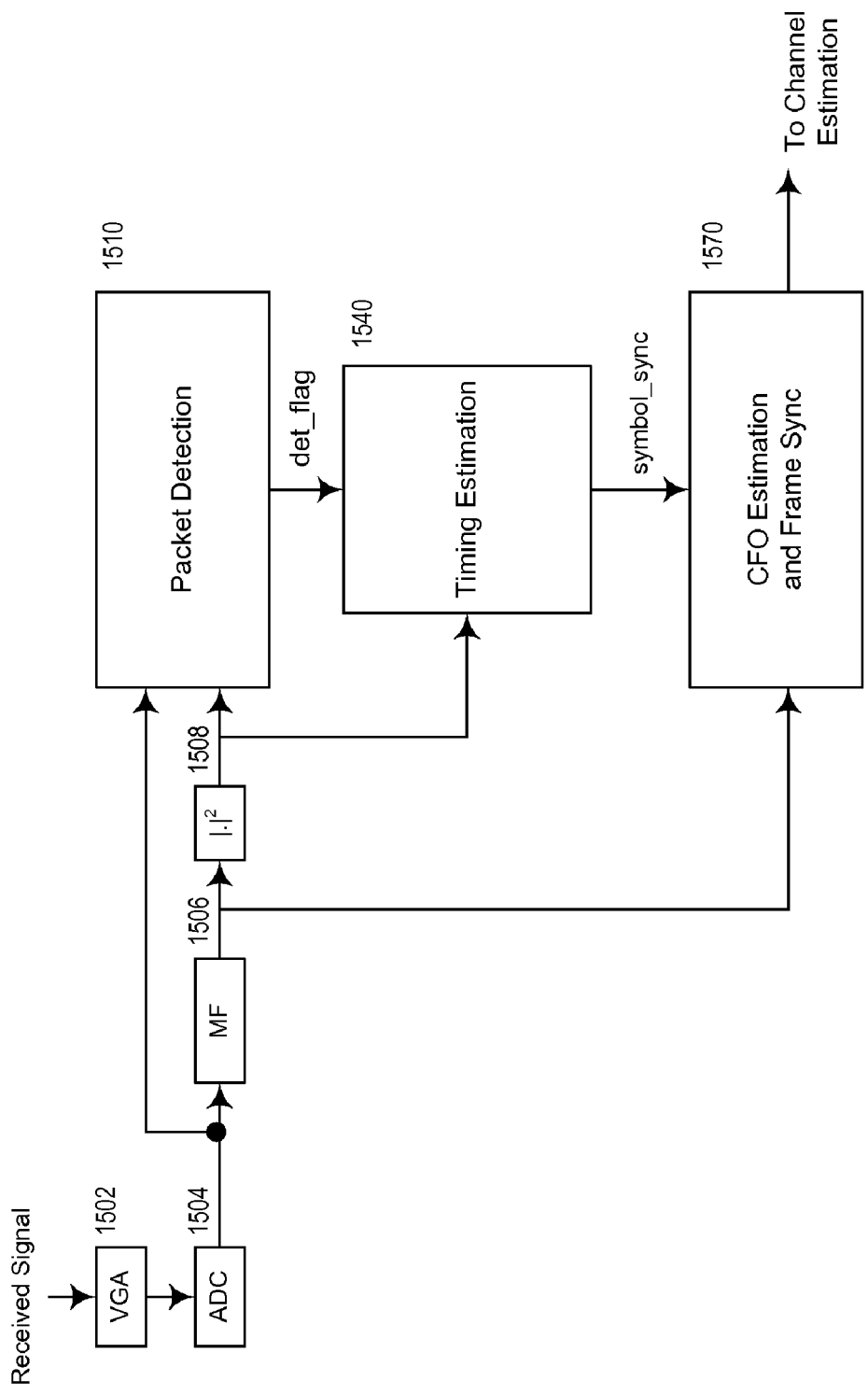
FIG. 15 is a block diagram of a synchronizer, which includes a packet detection module, a timing estimation module and a carrier frequency offset (CFO) estimation and frame synchronization module.

FIG. 15 illustrates a synchronizer 1500 for performing the major synchronization tasks. The synchronizer 1500 includes a variable gain amplifier (VGA) module 1502, an analog-to-digital converter (ADC) 1504, a matched filter (MF) 1506, a squaring unit 1508, a packet detection module 1510, a timing estimation module 1540 and a CFO estimation and frame synchronization module 1570.

Figure 17:
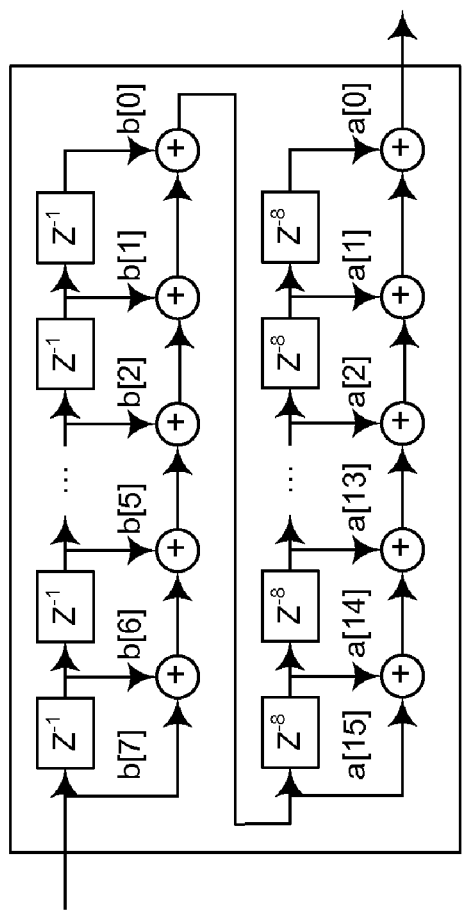
FIG. 17 is a first exemplary implementation of the matched filter of the synchronizer of FIG. 15.
Figure 18:
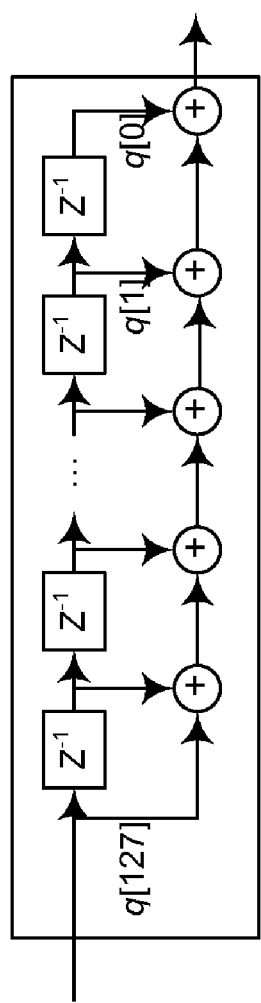
FIG. 18 is a second exemplary implementation of the matched filter of the synchronizer of FIG. 15; and, FIG. 19 is an exemplary implementation of a L-tap multipath energy combiner of the synchronizer of FIG. 15.

The coefficients {q[k], k=0, ..., 127} of the MF 1506 can be chosen either as the binary sequence {c[k], k=0, ..., 127} or the rounded preamble base sequence {round($s_{base}[k]$), k=0, 2, ..., 127}, as discussed above. Due to the hierarchical structure of the binary sequence {c[k]}, however, the implementation of the MF 1506 may be simplified as shown in a binary hierarchical sequence MF 1700 of FIG. 17; while for the rounded version, a finite impulse response (FIR) implementation MF 1800 is shown in FIG. 18, which in one approach is an FIR filter with 127 tapped delay lines.

In the rounded approach, the matched filter coefficients q[k], k=0, 2, ..., 127 is set to the rounded version of the preamble base sequence Round($s_{base}[k]$). As observed for all the preamble base sequences, Round($s_{base}[k]$) only takes values from {±2, ±1, 0}, which helps to reduce the hardware complexity as multiplication by 2 can be conveniently implemented as left shifting 1 bit. Also, as seen in FIG. 10, Round($s_{base}[k]$) maintains good cross-correlation property with the base sequence $s_{base}[k]$. The complexity of the two different methods for the matched filter implementation is summarized in the following table:

TABLE 1

Matched filter implementation comparison.

| Matched Filter Type | Number of Real Multiplications | Number of Real Additions | LUT Size (bits) |
|---|---|---|---|
| Binary Hierarchical | 0 | 22 | 10*(16 + 8) = 240 |
| Rounded Base Sequence | 0 | 127 | 10*128*3 = 3840 |

The number of operations is for either I or Q branch within one sample duration $T_{sample}$=1/528 MHz=1.89 ns. For each approach, the reference sequences can be stored in a lookup table (LUT) of the size as listed in Table 1.

The output of the MF 1506 is processed by the squaring unit 1508. Denoting the received samples as r[n], the magnitude square of the matched filter output may be expressed as:

$$R[n] = \left| \sum_{k=0}^{127} r[n+k] \cdot q[k] \right|^2,$$

Figure 19:
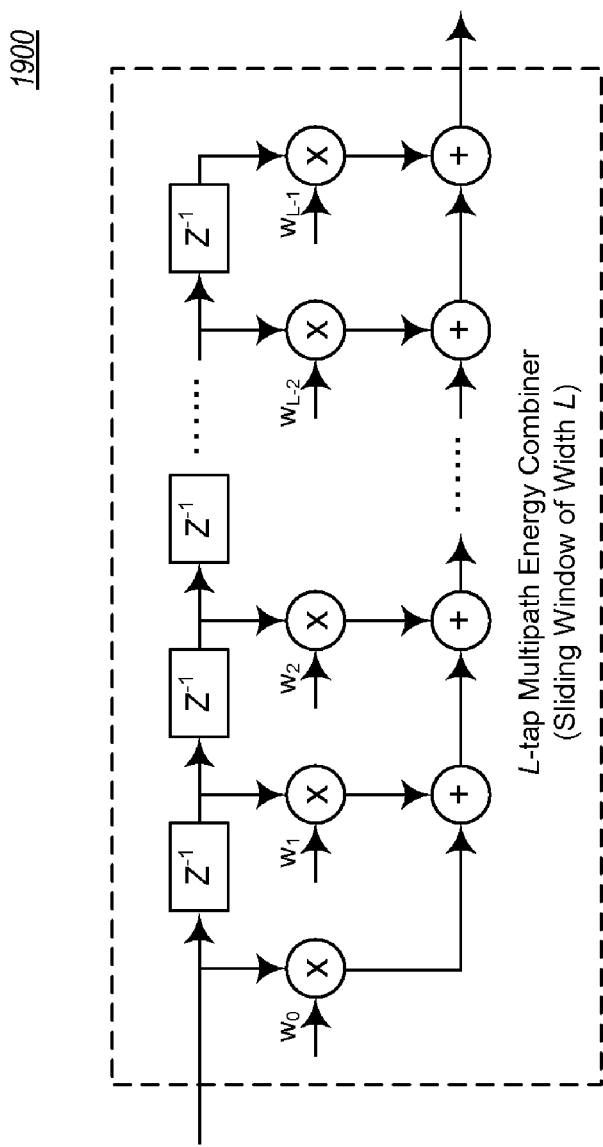

It is noted that an equal gain combining (EGC) operation may be performed to collect the energy from the multipath channels:

$$D[n] = \sum_{m'=n}^{n+N-1} R[m'],$$

where N is the number of consecutive paths that are combined and D[n] is the sliding window output. The EGC may be implemented as an L-tap multipath energy combiner 1900 as shown in FIG. 19. The L-tap multipath energy combiner 1900 allows a different weight to be assigned to each tap. The results of the EGC operation may be used by the packet detection module 1510 and the timing estimation module 1540.

As discussed, the first step in the synchronization process is for the packet detection module 1510 to detect the presence of a valid packet. The packet detection module 1510 will assert a packet detection signal to the timing estimation module 1540 after a valid packet has been detected. Specifically, once packet detection is asserted (i.e., the packet detection module 1510 has indicated that a packet has been detected by setting the det_flag to a logical true), the timing estimation module 1540 is enabled.

Figure 16:
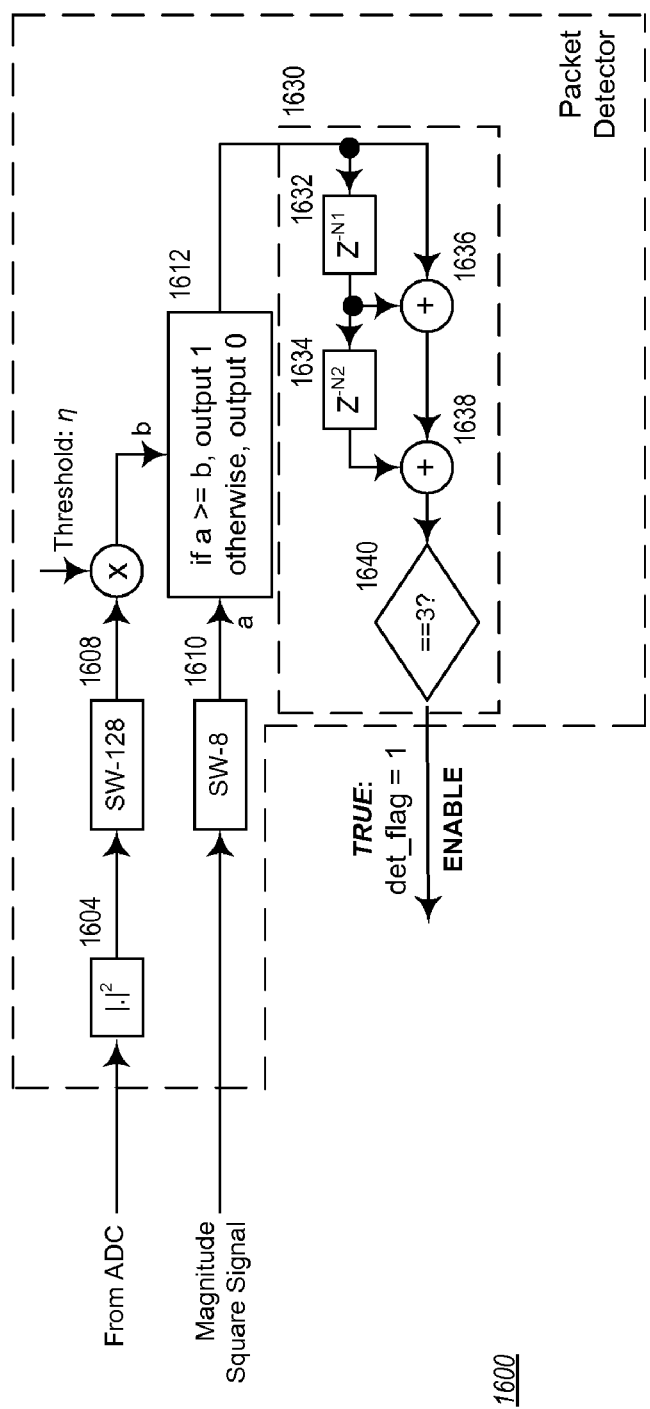
FIG. 16 is a packet detector implementing the packet detection module of the synchronizer of FIG. 15.

FIG. 16 illustrates an exemplary packet detector 1600 that may be implemented for the packet detection module 1510. Preferably, the packet detection module 1510 is designed to meet the following requirements:

1. Target missed detection probability.
2. Target false alarm probability.
3. Tolerate a maximal range of the variation of the initial CFO (+/−20 ppm): The maximal range of the variation of the CFO is 10296 MHz*40 ppm=411.84 KHz.
4. Robust to initial VGA gain: Before a packet is detected, the AGC is not settled. Instead, an initial VGA gain is applied to the received samples by the VGA 1502, which are then quantized by the ADC 1504. The detection algorithm works on the output sequence of the ADC 1504 and it has to be designed to be insensitive to the initial VGA gain.
5. Tolerant of low Signal-to-Noise Ratio (SNR): As the SNR can be as low as or below 0 dB, the packet detection module should be designed to work in such a SNR range.

Returning to FIG. 16, the packet detector 1600 includes a squaring unit 1604, an 128-unit wide sliding window (SW) unit 1608 and a 8-unit wide SW unit 1610, a comparator 1612, and a detection module 1630. The detection module 1630 includes a pair of buffers 1632, 1634, each respectively coupled to an adder in a pair of adders 1636, 1638. The output from the adder 1638 is then fed into a decision module 1640 that operates as described below.

As discussed above, the EGC operation may be performed to collect energy for multipath channels. In one approach, the size of the sliding window is chosen to be N=8. Thus, the EGC may be deployed using the 8-unit wide SW unit 1610 implemented as the L-tap multipath energy combiner 1900. In other approaches, the 8-unit wide SW unit 1610, instead of being a width of 8 units, may be implemented as more or less units. The specific choice of the number of units in the implementation may depend on the type of channel being processed.

The 8-unit wide SW output D[n] is then compared with the 128-unit wide SW output multiplied by a preset threshold η. The output of the comparator 1612 is either 1 (if D[n] is greater) or 0 (otherwise). Then, a "triple check" is performed by the check module 1630; i.e., the packet detector 1600 asserts packet detection (i.e., det_flag=1) when it observes three threshold-crossing events that are N1 and N2 apart. The values of N1 and N2 are dependant on the TFC, as shown in the following table:

TABLE 2

TFC-Dependent Parameters for Packet Detection.

| TFC Number | N1 | N2 |
|---|---|---|
| 1, 2 | 165 × 3 = 495 | 165 × 3 = 495 |
| 3, 4 | 165 × 5 = 825 | 165 |
| 5, 6, 7 | 165 | 165 |
| 8, 9, 10 | 165 × 2 = 330 | 165 × 2 = 330 |

The performance of the packet detector 1600 is measured for an additive white Gaussian noise (AWGN) channel and channel models 1 through 4 (CM1-CM4). TFC-1 is used in the simulation, and the performance is the same for other TFCs.

In one approach for the false alarm test, a total of 1 million hypothesis tests were simulated, in which only white Gaussian noise samples were input to the synchronizer 1500. For miss detection test, there were 500 channel realizations simulated for each channel model (CM1-CM4) and for each channel realization, there were 1,000 packets transmitted and tested.

As discussed above, the implementation of the MF 1506 may be simplified based on a binary hierarchical sequence implementation. When the MF 1506 is implemented using a binary hierarchical sequence, the MF structure can be simplified to be implemented as the binary hierarchical sequence MF 1700 as shown in FIG. 17. The threshold is chosen to meet the preset design values of miss detection and false alarm probabilities.

With regard to the effect of maximal range of the variation of the initial CFO, which is as defined above to be:

$$\Delta F = 10296 \text{ MHz} \times 40 \text{ ppm} = 411.84 \text{ KHz},$$

where 10296 MHz is the center frequency for the highest band (Band-14). The loss in the binary hierarchical sequence MF 1700 due to this maximal CFO is:

$$\text{Loss} = \left[ \frac{\sin(\pi N \cdot \Delta F \cdot T_s)}{\pi N \cdot \Delta F \cdot T_s} \right]^2 = -0.1429 \text{ dB},$$

where N=128 is the coherent accumulation length and $T_s=1/$ (528 MHz) is the sampling period.

Since the VGA gain is initially set to the maximal value, one potential problem encountered during packet detection is that for a large SNR scenario, the received signal may be mostly clipped after the ADC. To investigate this problem, additional simulation has been performed to test the miss detection probability for a fairly large dynamic range of the received SNR. Since the maximum received signal strength is −43 dBm (corresponding to the closest targeted operating distance 0.3 m), and the minimum received signal strength is −81 dBm (corresponding to the sensitivity for 53.3 Mbps), the received SNR can be assumed to be in a range of 38 dB. In the simulation, the test was performed from SNR=5 dB to 40 dB to ensure that the simulation covers the complete dynamic range. In the evaluation, the VGA gain is set to be the maximal gain and 6-bit ADC is used. From the simulation results, no error events (i.e., miss detection) are observed for CM1 throughout CM4 within this SNR range. This indicates that the packet detection algorithm is robust for the initial maximal VGA gain setting in the SNR dynamic range.

The implementation of the MF 1506 may also be simplified based on a rounded sequence implementation, where the MF 1506 is implemented as the FIR implementation MF 1800 as shown in FIG. 18. The matched filter coefficients q[k], k=0, 2, ..., 127 is set to the rounded version of the preamble base sequence Round($s_{base}$[k]). As observed for all the preamble base sequences, Round($s_{base}$[k]) only takes values from {±2, ±1, 0}, which helps to reduce the hardware complexity as multiplication by 2 can be conveniently implemented as left shifting 1 bit. Also, as seen in FIG. 10, Round($s_{base}$[k]) maintains good cross-correlation property with the base sequence $s_{base}$[k]. The miss detection performance of the rounded base sequence has a slight gain over that of the binary hierarchical sequence with a slightly lower overall false alarm probability.

It is to be understood that the embodiments described herein may be implemented by a combination of hardware and software, firmware, middleware, and/or microcode. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For an implementation including software, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. Apparatus for detecting a transmitted symbol encoded with a time-frequency code (TFC) base sequence, the TFC base sequence generated from an intermediate binary hierarchical sequence based on predetermined binary sequences of the TFC, the apparatus comprising:
   a matched filter having predetermined coefficients based on a simplified version of the TFC base sequence.

2. The apparatus of claim 1, wherein the simplified version of the TFC base sequence is the intermediate binary sequence, the matched filter configured with the intermediate binary sequence as the coefficients.

3. The apparatus of claim 1, wherein the simplified version of the TFC base sequence is a rounded version of the TFC base sequence, the matched filter configured with the rounded version of the TFC base sequence as the coefficients.

4. The apparatus of claim 1, further comprising a normalization unit comprising a sliding window module, wherein the normalization unit is configured to create a normalized version of a transmitted signal including the transmitted symbol.

5. The apparatus of claim 1, further comprising a detector module configured to detect a plurality of threshold-crossing events, wherein the plurality of threshold-crossing events comprises a detected energy in a transmitted signal including the transmitted symbol that is greater than a predetermined signal-to-noise ratio.

6. The apparatus of claim 1, further comprising a multipath energy combiner configured to combine a predetermined number of estimated magnitude of channel taps within a search window to determine an energy.

7. The apparatus of claim 6, further comprising assigning a weight to each of the predetermined number of estimated magnitude of channel taps within the search window.

8. A method for packet detection comprising:
   receiving a transmitted symbol encoded with a time-frequency code (TFC) base sequence in a transmitted signal, the TFC base sequence generated from an intermediate binary hierarchical sequence based on predetermined binary sequences of the TFC; and,
   filtering the received signal using a matched filter including a plurality of predetermined coefficients based on a simplified version of the TFC base sequence.

9. The method of claim 8, wherein the simplified version of the TFC base sequence is the intermediate binary sequence, the matched filter configured with the intermediate binary sequence as the plurality of coefficients.

10. The method of claim 8, wherein the simplified version of the TFC base sequence is a rounded version of the TFC base sequence, the matched filter configured with the rounded version of the TFC base sequence as the plurality of coefficients.

11. The method of claim 8, further comprising creating a normalized version of the transmitted signal.

12. The method of claim 8, further comprising detecting a plurality of threshold-crossing events, wherein the plurality of threshold-crossing events comprises a detected energy in the transmitted signal that is greater than a predetermined signal-to-noise ratio.

13. The method of claim 8, further comprising combining a predetermined number of estimated magnitude of channel taps within a search window to determine an energy.

14. The method of claim 13, further comprising assigning a weight to each of the predetermined number of estimated magnitude of channel taps within the search window.

15. An apparatus for packet detection comprising:
   means for receiving a transmitted symbol encoded with a time-frequency code (TFC) base sequence in a transmitted signal, the TFC base sequence generated from an intermediate binary hierarchical sequence based on predetermined binary sequences of the TFC; and,
   means for filtering the received signal using a matched filter including a plurality of predetermined coefficients based on a simplified version of the TFC base sequence.

16. A computer program product, comprising:
   non-transitory computer-readable medium comprising:
   code for causing a computer to receive a transmitted symbol encoded with a time-frequency code (TFC) base sequence in a transmitted signal, the TFC base sequence generated from an intermediate binary hierarchical sequence based on predetermined binary sequences of the TFC; and,
   code for causing the computer to filter the received signal using a matched filter including a plurality of predetermined coefficients based on a simplified version of the TFC base sequence.

17. A processor, comprising:
   a memory, the memory configured to cause the processor to implement a method for packet detection, the method comprising:
   receiving a transmitted symbol encoded with a time-frequency code (TFC) base sequence in a transmitted signal, the TFC base sequence generated from an intermediate binary hierarchical sequence based on predetermined binary sequences of the TFC; and,
   filtering the received signal using a matched filter including a plurality of predetermined coefficients based on a simplified version of the TFC base sequence.

* * * * *